United States Patent [19]
Uhm et al.

[11] Patent Number: 5,942,206
[45] Date of Patent: Aug. 24, 1999

[54] CONCENTRATION OF ISOTOPIC HYDROGEN BY TEMPERATURE GRADIENT EFFECT IN SOLUBLE METAL

[75] Inventors: Han S. Uhm; Woodrow W. Lee, both of Potomac, Md.

[73] Assignee: The United States of America as represented by the Secretary of the Navy, Washington, D.C.

[21] Appl. No.: 07/749,357

[22] Filed: Aug. 23, 1991

[51] Int. Cl.$^6$ ....................................................... C01B 3/00
[52] U.S. Cl. .................................. 423/648.1; 423/647.7; 376/100; 420/900
[58] Field of Search .................................. 376/100, 103, 376/114, 115, 146, 156; 420/900; 423/648.1, 647.1

[56] References Cited

U.S. PATENT DOCUMENTS

| | | | |
|---|---|---|---|
| 3,571,594 | 3/1971 | Nobel | 376/114 |
| 3,746,859 | 7/1973 | Hilton et al. | 376/115 |
| 3,816,785 | 6/1974 | Miller | 376/151 |
| 3,924,137 | 12/1975 | Alger | 376/151 |
| 4,935,194 | 6/1990 | Verschoore | 376/114 |

FOREIGN PATENT DOCUMENTS

| | | | |
|---|---|---|---|
| 90/10935 | 9/1990 | WIPO | 376/100 |
| 90-15415 | 12/1990 | WIPO . | |

OTHER PUBLICATIONS

Huizenga, "Cold Fusion: The Scientific Fiasco of the Century", University of Rochester Press, 1992, pp. 22–41, 58–83, 86–91, 128–189, 200–223, 240–259.
The Washington Times, Mar. 24, 1989, p. A5, article by D. Braaten.
The New York Times, May 3, 1989, pp. A1, A22, article by M. Browne.
J. Electroanal. Chem. vol. 266, (1989) pp. 437–450, Kreysa et al.
J. of Nucl. Sci. and Tech., vol. 26, No. 7, (Jul. 1989), pp. 729–732, Ohashi et al.
Science, vol. 246, No. 4931, Nov. 10, 1989, pp. 793–796, Miskelly et al.
Nature, vol. 340, Aug. 17, 1989, pp. 525–530, Lewis et al.
UCRL–101583, Jul. 1989, Chapline, pp. 1–9.
The Wall Street Journal, Apr. 26, 1989, p. B4, article by D. Stipp.
The Washington Post, May 2, 1989, pp. A1, A7, article by P. Hilts.
The Washington Post, Jul. 13, 1989, p. A14.
Z. Phys. A.—Atomic Nuclei, vol. 333, (1989) pp. 319–320, Alber et al.
ORNL/FTR–3341, Jul. 31, 1989, pp. 2–15, Cooke.
J. Radioanal. Nucl. Chem., Letters, vol. 137, No. 1, (Aug. 21, 1989), pp. 23–28, Horanyi.
J. Radioanal. Nucl. Chem., Letters, vol. 137, No. 1, (Aug. 21, 1989), pp. 9–16, Faller et al.
Solid State Communications, vol. 72, No. 4, (1989) pp. 309–313, Hajdas et al.

(List continued on next page.)

*Primary Examiner*—Daniel D. Wasil
*Attorney, Agent, or Firm*—John Forrest; Jacob Shuster

[57] ABSTRACT

Isotopic hydrogen enrichment in a soluble metal is achieved through temperature gradient effects by applying a heat source and a heat sink to two spaced regions of the metal within which isotopic hydrogen atoms are absorbed and enclosed by a diffusion-barrier material. The temperature gradient so created forces the atoms of hydrogen in the hot region to migrate into the cold region, resulting in higher isotopic hydrogen density in the cold region. Discharge of the absorbed isotopic hydrogen is prevented effectively by the diffusion-barrier material.

3 Claims, 4 Drawing Sheets

OTHER PUBLICATIONS

Physical Review Letters, vol. 62, No. 25, Jun. 19, 1989, pp. 2929–2932, Ziegler et al.

Z. Phys. B–Condensed Matter, vol. 76, No. 2, pp. 141–142, (1989), Schrieder et al.

Physical Review Letters, vol. 63, No. 18, Oct. 30, 1989, pp. 1926–1929, Price et al.

Physics Letters B, vol. 228, No. 1, Sep. 7, 1989, pp. 163–166, Cribier et al.

Solid State Communications, vol. 72, No. 1, (1989) pp. 53–57, Shani et al.

The Washington Post, Mar. 29, 1990, p. A3.

Nature, vol. 344, Mar. 29, 1990, pp. 401–405, Salamon et al.

Myers et al, J. Fusion Energy, Sep. 1990, pp. 263–268.

Besenbacher et al, J. Fusion Energy, Sep. 1990, pp. 315–317.

Bressani et al, "II Annual Conf. on Cold Fusion,"Jun. 29–Jul. 4, 1991, *21$^{st}$Century*, pp. 15–39.

CONCENTRATION OF ISOTOPIC HYDROGEN BY TEMPERATURE GRADIENT EFFECT IN SOLUBLE METAL

BACKGROUND OF THE INVENTION

This invention relates to the enrichment of isotopic hydrogen in a solid-state metal by use of temperature gradient effects, and is related to the subject matter disclosed in prior copending application Ser. No. 07/724,083, filed Jul. 1, 1991.

High concentration of isotopic hydrogen in the form of deuterium atoms in a soluble metal such as palladium, is very useful for various electro-chemical studies and other purposes such as neution generated for radiography investigations as indicated in our aforementioned prior copending applicated. A conventional technique used for deuterium enrichment purposes involves electrolysis, where a palladium rod is immersed in heavy water as the cathode. According to the prior copending application, aforementioned, deuterium density inside a palladium rod is increased by making use of plasma ion implantation. Although plasma ion implantation can provide an unlimited deuterium concentration, it requires elaborate technical arrangements and tools.

It is therefore an important object of the present invention to concentrate high-density deuterium in a local volume of a soluble metal, such as palladium, in a less costly and simpler manner.

SUMMARY OF THE INVENTION

In accordance with the present invention, a heat source and heat sink respectively contact two different temperature regions of a palladium sample, (presoaked with deuterium atoms and coated with or securely locked in a metal case of diffusion-barrier material), to create a temperature gradient. Since the solubility of deuterium in palladium is a decreasing function of temperature, the deuterium atoms in the hot region are forced to migrate into the cold region due to the solubility difference created between the regions. Such migration results in a highly concentrated deuterium density in the cold region. The loss rate of deuterium from the palladium sample is found to be inversely proportional to the thickness of the diffusion barrier material, and proportional to the diffusion coefficient and solubility of deuterium atoms in the barrier material. A barrier material, such as a thin layer of an iron-nickel alloy, provides small values of diffusion coefficient and solubility so as to reduce the discharge of absorbed deuterium from the palladium rod surface while taking into account possible erosion or cracking of the barrier coating after prolonged use.

Solubility of deuterium atoms in palladium is found to be a decreasing function of the palladium temperature so that once the temperature gradient is established, the deuterium atoms in the hot region start to migrate into the cold region and the deuterium density eventually settles into a steady-state value. The deuterium density in the steady-state condition is also determined to be a few times greater than its initial value when a reasonably small solubility ratio of the cold and hot regions is assumed.

BRIEF DESCRIPTION OF DRAWING FIGURES

Other objects, advantages and novel features of the invention will become apparent from the following detailed description of the invention when considered in conjunction with the accompanying drawing wherein.

DETAILED DESCRIPTION OF PREFERRED EMBODIMENTS

Figure 1:
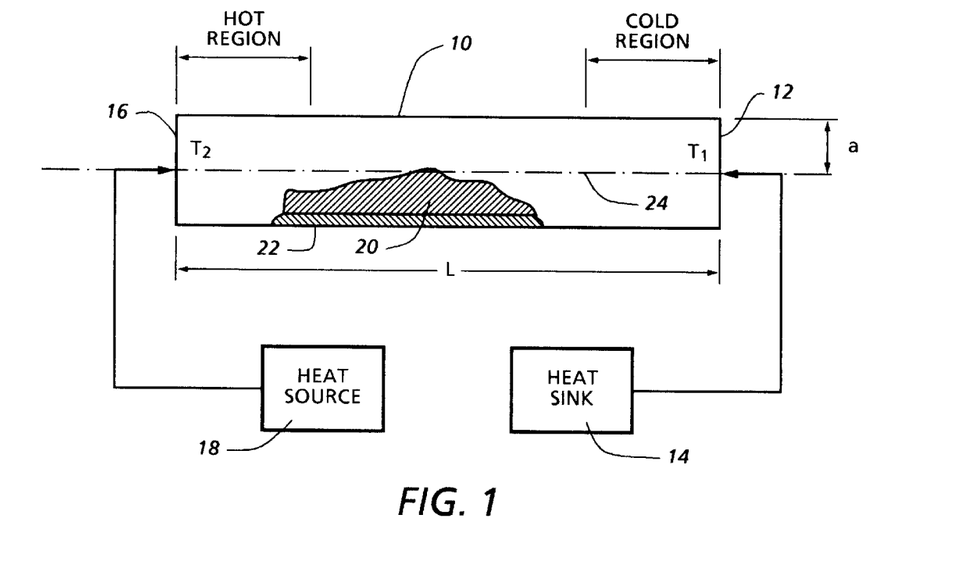
FIG. 1 is a schematic side section view of a palladium rod type arrangement in accordance with one embodiment of the invention.

Referring now to FIG. 1 of the drawing, a linear geometry arrangement is illustrated for a palladium sample such as cylindrical rod 10 in which a constant temperature gradient is established along the rod length. One axial end 12 of the rod 10 along its axis 24 (at x=0) is in contact with a heat sink 14 of temperature $T_1$ to establish a cold region while the other axial end 16 at (x=L) is in contact with a heat source 18 of temperature $T_2$ to establish a hot region. The temperature inside the palladium rod is expressed as $$T = \frac{T_2 - T_1}{L}x + T_1. \qquad (1)$$

With both the heat sink and heat source turned-on at the time t=0, the temperature T(x) in equation (1) of the steady-state condition is established within a few seconds due to the high heat conductivity of the body 20 of the cylindrical palladium rod 10. On the other hand, response of deuterium atoms absorbed in the palladium body to this temperature gradient is not as fast as the temperature change since the motion of the atoms is governed by diffusion. Discharge of the absorbed deuterium atoms from the surface of the palladium body is prevented or slowed down by a thin layer of coating material 22 as shown in FIG. 1, having a low diffusivity and a low solubility for deuterium. Such a coating impedes the outward diffusion of the deuterium atoms, forming a diffusion barrier. Diffusion coefficient and solubility of deuterium in some metallic host materials are summarized in the following Table under room temperature at atmospheric pressure.

TABLE

| Metal | Diffusion Coefficient(D) (cm² sec⁻¹) | Diffusion Soluability(s) (gm atom cm⁻³) |
| --- | --- | --- |
| Pd | $3 \times 10^{-7}$ | $3 \times 10^{-4}$ |
| Ni | $1 \times 10^{-9}$ | $1 \times 10^{-5}$ |
| Fe | $6 \times 10^{-5}$ | $4 \times 10^{-9}$ |
| Fe—Ni Alloy | $1 \times 10^{-10}$ | $4 \times 10^{-6}$ |
| Fe$_2$O$_3$ | $1 \times 10^{-18}$ | |
| Cr$_2$O$_3$ | $9 \times 10^{-16}$ | |

A presently preferred diffusion barrier coating material consists of 60% iron and 40% nickel in weight for three Fe-Ni alloy in the foregoing table. The diffusion coefficient(D) and solubility(S) of Fe-Ni alloys are much less than those for palladium.

Figure 2:
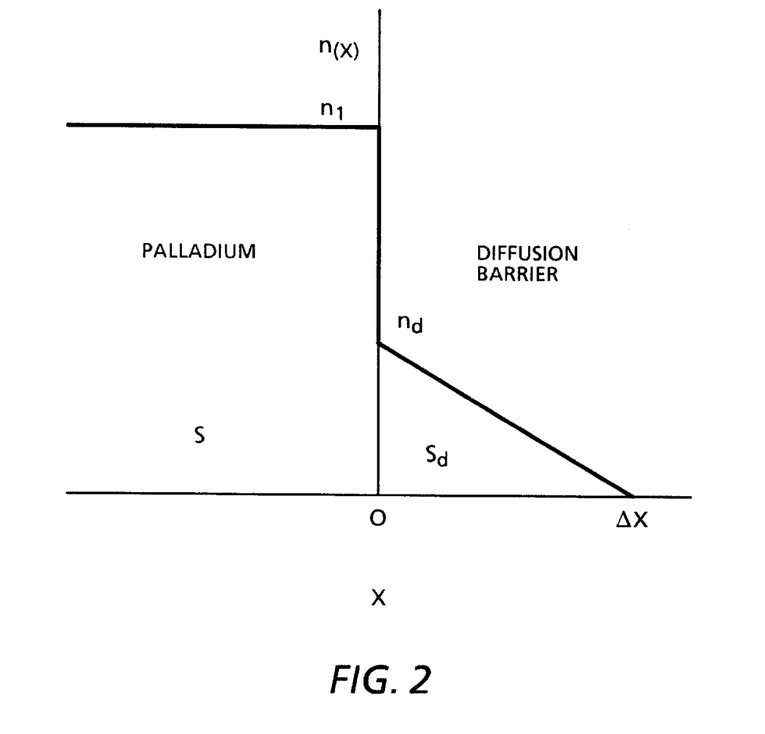
FIG. 2 is a graphical presentation of the deuterium density inside palladium and diffusion-barrier material.

Shown in FIG. 2 is a graphical presentation of the deuterium density across palladium and diffusion-barrier material. The interface of palladium and the diffusion-barrier material is represented by the x=0 plane. The thickness of the diffusion barrier is denoted by $\Delta x$. The deuterium density inside palladium is represented by $n_1$ which is uniform once the barrier material is applied to the surface of the palladium body of rod 10. According to the equilibrium condition, the deuterium density $n_d$ in the barrier at x=0 is given by $$n_d = \frac{S_d}{S} n_1, \tag{2}$$

where $S$ and $S_d$ are the solubilities of deuterium in palladium and diffusion-barrier material, respectively. Note from equation (2) that the deuterium density $n_d$ in the barrier is much less than that in palladium if the solubility ration $S_d/S$ is much less than unity, which is a typical feature of the barrier material.

The deuterium density inside the diffusion barrier ($0<x<\Delta x$) is expressed as $$N(x) = n_d \left(1 - \frac{x}{\Delta x}\right). \tag{3}$$

Thus, the flux $\Gamma$ of deuterium atoms leaking through the diffusion barrier is given by $$\Gamma(x) = D_d \frac{n_d}{\Delta x}, \tag{4}$$

where $D_d$ represents the diffusion coefficient of deuterium in the diffusion-barrier material. Regognizing that total surface area of the palladium rod of length L is $A=2\pi a(L+a)$, the net loss of the deuterium number density per unit time from palladium is given by $$\frac{dn_1}{dt} = -\frac{n_1}{\tau}, \tag{5}$$

where the diffusion-loss time $\tau$ is defined by $$\tau = \frac{SaL\Delta x}{2D_d S_d(L+a)}. \tag{6}$$

Assuming that the initial deuterium density in the palladium rod 10 is $n_0$, equation (5) is integrated over time t and the result is given by $$n_1(t) = n_0 \exp(-t/\tau). \tag{7}$$

The effectiveness of the diffusion barrier in preventing deuterium leakage from the palladium rod, may be determined by calculating the diffusion-loss time $\tau$ in equation (6) for the iron-nickel alloy barrier 22 with its thickness of $\Delta x = 1$ µm. For a palladium rod having a radius a=1 cm and length L=10 cm, and substituting the parameters $\Delta x=10^{-4}$ cm, $S/S_d=75$, $D_d=10^{-10}$ cm$_2$ sec$^{-1}$ into equation (6), the diffusion-loss time $\tau=3.4\times 10^7$ seconds, corresponds to 1.1 years, during which the deuterium density inside the palladium body 20 reduces to 1/e times its original value.

Palladium metal, in which a large amount of isotopic hydrogen (or deuterium) can be dissolved, forms two phases as they are absorbed. The α-phase is considered to be a solution of deuterium in the palladium metal while the β-phase is related to the formation of palladium deuteride. The primary interest in the β-phase is based on the fact that the deuterium solubility in palladium can be very high even under ambient atmospheric conditions. Speedy absorption of deuterium was heretofore limited by its diffusivity and solubility inside the palladium. The diffusion coefficient D of deuterium atoms in palladium increases drastically as temperature of the palladium rod increases from 0° to 100° C. Meanwhile, the solubility S of deuterium in palladium decreases as the temperature increases. The optimum absorption of deuterium occurs at a temperature of about 50° C., where both its diffusion coefficient and solubility are relatively high for deuterium atoms under one atmospheric pressure.

The loss rate of the deuterium atoms from the fully saturated palladium rod 10 is estimated by use of the diffusion equation:

$$\frac{\partial}{\partial t} n(x,t) + \nabla \Gamma(x,t) = h(x,t), \tag{8}$$

where n(x,t) is the density of deuterium atoms in the palladium rod and h(x,t) is the source of deuterium atoms. The flux function $\Gamma(x,t)$ in equation (8) is defined by $$\Gamma(x,t) = -D(x)\bar{\nabla} n(x,t), \tag{9}$$

where D(x) is the diffusion coefficient of deuterium atoms in palladium. The source h(x,t) of the deuterium atoms vanishes during the discharging period of the absorbed deuterium from the palladium rod. Therefore, the diffusion equation (9) is expressed as $$\frac{\partial}{\partial t} n(r,t) - \frac{1}{r}\frac{\partial}{\partial r}\left[D(r)r \frac{\partial}{\partial r} n(r,t)\right] = 0, \tag{10}$$

for the cylindrical coordinate system, where r is the radial distance from the axis 24 of the palladium rod 10. In general, the diffusion coefficient D is a function of the radial coordinate and is assumed to be constant.

Assuming that at time t=0, the deuterium atoms start to leak from the palladium surface, the deuterium density n at t=0 is expressed as $$n(r) = n_0, \quad 0 < r < a, \tag{11}$$

where a is the radius of the palladium body and $n_0$ is the initial deuterium density when the palladium body is fully charged with deuterium atoms. Obviously the solution to equation (10) at t>0 is given by $$n(r,t) = \sum_{n=0}^{\infty} a_n J_0\left(\beta_n \frac{r}{a}\right) \exp(-\beta_n^2 \zeta), \quad (12)$$

where $J_l(x)$ is the Bessel function of the first kind of order l, $\beta_n$ is the nth root of $J_0(\beta_n)=0$, and $a_n$ is the coefficient determined from the initial condition. The normalized time $\zeta$ in equation (12) is defined by $$\zeta = \frac{D}{a^2} t. \quad (13)$$

The solution in equation (12) approaches equation (11) when $\zeta=0$. Thus the coefficient $a_n$ is related to the solution in equation (11) by $$\Sigma_n a_n J_0(\beta_n r/a) = n_0. \quad (14)$$

Multiplying both sides of equation (14) by $rJ_0(\beta_n r/a)$ and making use of the orthogonality of the Bessel function $$\int_0^1 x J_1(\alpha x) J_1(\beta x) dx = \begin{cases} 0, & \alpha \ne \beta, \\ 2[J_{l+1}(\alpha)], & \alpha = \beta, \end{cases} \quad (15)$$

we obtain the coefficient $$a_n = \frac{2n_0}{\beta_n J_1(\beta_n)}. \quad (16)$$

Substituting equation (16) into equation (12), the deuterium-atom density n(r,t) is expressed by $$n(r,t) = 2n_0 \sum_n \frac{J_0(\beta_n r/a)}{\beta_n J_1(\beta_n)} \exp(-\beta_n^2 \zeta). \quad (17)$$

Multiplying both sides of equation (17) by $2\pi r$ and integrating over r from 0 to a, the deuterium-atom number N(t) per unit axial length is defined by $$\frac{N(t)}{N_0} = 4\Sigma_n \frac{\exp(-\beta_n^2 \zeta)}{\beta_n^2}, \quad (18)$$

where $N_0 = \pi a^2 n_0$ is the deuterium-atom number per unit axial length at t=0.

Figure 3:
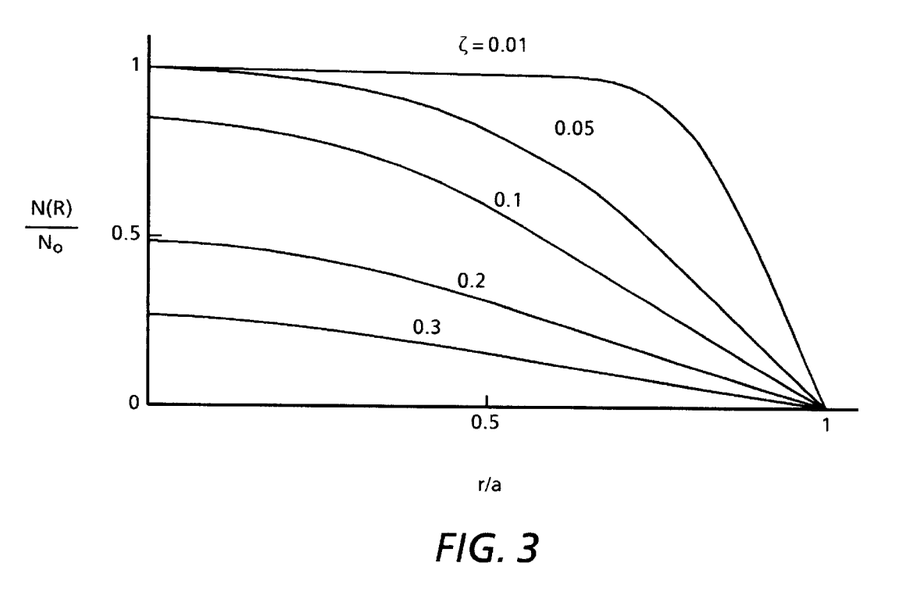
FIG. 3 are plots of normalized deuterium density $n(r)/n_0$ in a palladium rod without diffusion-barrier coating, versus the radial coordinate $r/a$ for several different values of normalized time $\zeta$.
Figure 4:
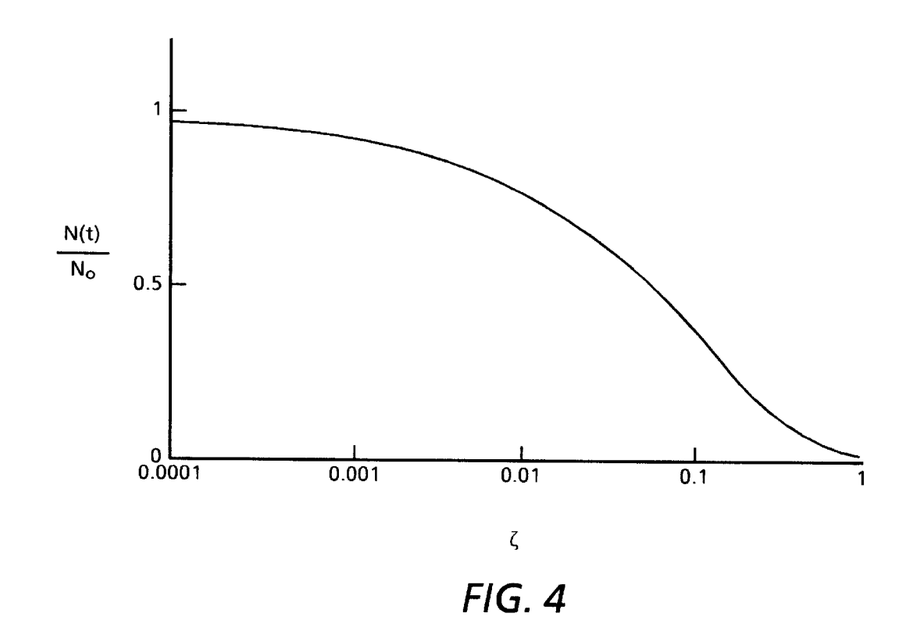
FIG. 4 is a plot of normalized deuterium atom number $N(t)/N_0$ in a palladium rod without diffusion-barrier coating, versus the normalized time $\zeta$.

The plots of the normalized deuterium density $n(r)/n_0$ versus the radial coordinate r/a shown in FIG. 3, are obtained from equation (17) for several different values of the normalized time $\zeta$. Since the deuterium atoms near the palladium rod surface start to leak first, the deuterium density near the surface drops very quickly. The deuterium density at the center of the rod also reduces when the time $\zeta$ is larger than 0.1. The plot of the normalized deuterium-atom number $N(t)/N_0$ versus the normalized time $\zeta$ presented in FIG. 4, is obtained from equation (18). About two percent of deuterium atoms leave the palladium rod within the time of $\zeta = 10^{-4}$. Accordingly, all of the deuterium atoms will eventually leave the palladium body if not for the diffusion barrier of coating 22 preventing leaking of the absorbed deuterium atoms as hereinbefore explained.

The solubility S of deuterium atoms in the palladium body 20 depends strongly on both the palladium temperature T and the pressure p of the ambient deuterium gas which is in contact therewith. It is presently known that the solubility S(p,T) is and increasing function of the pressure p and a decreasing function of the temperature T, due to exothermicity associated with palladium-hydrogen bonding. In general, $$\frac{\partial}{\partial p} S(p,T) > 0, \quad \frac{\partial}{\partial T} S(p,T) < 0. \quad (19)$$

Since the palladium rod 10 is completely sealed by its diffusion-barrier coating 22 after body 20 is soaked in a pressurized deuterium gas, the deuterium atoms in the hot region are forced to migrate into the cold region because of temperature gradient in accordance with the general properties set forth by equation (19). It is important to note that the diffusion coefficient D of deuterium in palladium is also an increasing function of local temperature in palladium, i.e., $$\frac{d}{dT} D(T) > 0. \quad (20)$$

Usually the local temperature T in the palladium rod is well specified by its location in the rod, i.e., T=T(x). Therefore, the solubility S and the diffusion coefficient D are also described as functions of location in the palladium rod, i.e., $S(p,T)=S(p,x)$ and $D(T)=D(x)$. The temperature and solubility at the time t<0 are denoted by $T=T_0$ and $S(p_0,T_0)=S_0$, respectively, where $p_0$ is the deuterium gas pressure during the presoaking. Note that the deuterium density at the time t=0 is $n(x)=n_0$, which is a uniform value over the entire volume of the palladium rod. Once the temperature gradient is established, the deuterium atoms in the hot region migrate into the cold region, settling eventually into the steady-state value at the time $t \to \infty$. In order to determine the deuterium density profile in the steady-state condition, the local solubility S=S(n,T) of deuterium atoms in palladium must be defined when the palladium road is completely isolated. It is assumed that the local solubility S(n,T) deceases as the local temperature in the rod increases as shown by equation (19). Since the total number of deuterium atoms in the rod is fixed during the migration, the local solubility S(n,T) is a direct manifestation of the local deuterium density. The deuterium density in the steady-state condition is therefore expressed as $$n(T) = \frac{S(n,T)}{S_0} n_0, \quad (21)$$

which must satisfy the conservation of deuterium-atom number, i.e., $$\int n(T) dv = \pi a^2 L n_0, \quad (22)$$

where dv=dxdydz is the volume element in the integration. The conservation of deuterium-atom number in equation (22) can also be expressed as $$\left[\frac{\partial}{\partial u}n(x,t)\right]_A = 0, \qquad (23)$$

where $(\partial/\partial u)n$ represents the derivation of the density with respect to the direction perpendicular to the surface A of the palladium rod.

In regard to changes in deuterium solubility, the atomic ratio $\gamma$ in the palladium rod 10 in one atmospheric pressure drops abruptly from $\gamma=0.6$ to zero as the palladium temperature increases from 100° C. to 107° C. Based thereon, it is assumed that the local solubility S is approximately expressed as $$S(n,T) = \begin{cases} S_1, & T_i < T < T_c, \\ S_2, & T_c < T < T_2 \end{cases} \qquad (24)$$

where $T_c$ is the critical temperature at which the local solubility changes discontinuously and wherein $S_1 > S_2$ is consistent with Equation (19).

Identifying the location $x=l$ which corresponds to $T(l)=T_c$ from equation (1), the local solubility in Equation (23) is also expressed as $$S(x) = \begin{cases} S_1, & 0 < x < l, \\ S_2, & l < X < L. \end{cases} \qquad (25)$$

Substituting equation (24) into equation (21) and making use of equation (22), we find the steady-state density $$n(x) = \begin{cases} n_1 = \left[\frac{L}{l} - \varepsilon\left(\frac{L}{l} - 1\right)\right]n_0, & 0 < x < l, \\ n_2 = \varepsilon n_0, & l < x < L, \end{cases} \qquad (26)$$

where the normalized remnant density $\varepsilon$ is related to the solubility by $$\varepsilon = \frac{\frac{S_2}{S_1}}{\frac{l}{L} + \left(1 - \frac{l}{L}\right)\frac{S_2}{S_1}}. \qquad (27)$$

Thus, the deuterium concentration ($n_1$) in the cold region is sensitive to the ratio $S_2/S_1$ of the local solubility. Equations (25) and (26) also reflect that concentration of deuterium in the cold region increases as the value of the parameter l/L reduces and as the ratio $S_2/S_1$ reduces.

The transient deuterium density is calculated from the diffusion equations (8) and (9). Although the diffusion coefficient D(T) of deuterium atoms in palladium is a sensitive function of the palladium temperature T, it is assumed that the coefficient D is a constant, in order to make the subsequent calculation analytically tractable. If the temperature difference between the heat source 18 and sink 14 is relatively small, the assumption of a constant diffusion coefficient is well justified. In the cartesian coordinate, the diffusion equation is expressed as $$\frac{\partial}{\partial t}n(x,t) - D\frac{\partial^2}{\partial x^2}n(x,t) = 0. \qquad (28)$$

It should be noted that the real deuterium density at t=0 is uniform throughout the rod, despite the already established temperature gradient, in as much as a density gradient drives the diffusion motion of deuterium atoms. The effective deuterium density may therefore be described in terms of the temperature gradient, wherein the effective density $n_{\mathit{eff}}$ at the time t=0 is defined by $$n_{\mathit{eff}} = \begin{cases} n_0, & 0 < x < l, \\ n_1 + (1-\varepsilon)n_0, & l < x < L, \end{cases} \qquad (29)$$

which is discontinuous at x=l. The number density $n_1$ in equation (28) is the concentration density in the cold region defined in Equation (27). The effective density in the steady-state condition at the time $t \to \infty$ is given by $$n_{\mathit{eff}} = n_1, \quad 0 < x < L. \qquad (30)$$

Equation (28) reflects that the abrupt density change at x=l causes migration of deuterium atoms from the hot to cold region in accordance with the diffusion equation (29). Once the effective density is calculated, the real deuterium density is determined from $$n(x,t) = n_{\mathit{eff}}(x,t) - \frac{L}{l}(1-\varepsilon)n_0 U[(L-x)(x-l)], \qquad (31)$$

where U(z) is the Heaviside step function defined by U(z>0)=1 and U(z<0)=0.

The effective deuterium density $n_{\mathit{eff}}$, which satisfies equation (28) at the time t>0 is given by $$n_{\mathit{eff}}(x,t) = n_1 + \sum_{s=1}^{\infty} a_s \cos\left(sn\frac{x}{L}\right)\exp(-s^2\eta), \qquad (32)$$

where $a_s$ is coefficient determined from the initial condition and the normalized time $\eta$ is defined by $$\eta = \frac{n^2 D}{L^2}t. \qquad (33)$$

Equation (32) satisfies the boundary condition of equation (23). The solution in equation (32) approaches that of equation (29) when $\eta=0$. Thus the coefficient $a_s$ is related to the difference of the steady-state solutions of equations (29) and (30), which is expressed as $$\sum_s a_s \cos\left(sn\frac{x}{L}\right) = \begin{cases} n_0 - n_1, & 0 < x < l \\ (1-\varepsilon)n_0, & l < x < L. \end{cases} \qquad (34)$$

Multiplying both sides of equation (34) by $\cos(s'\pi x/L)$ and making use of the orthogonality of the cosine function, one obtains $$a_s = -\frac{L}{l}(1-\varepsilon)n_0 \frac{2}{sn}\sin\left(sn\frac{l}{L}\right). \qquad (35)$$

Substituting Equation (34) into Equation (31), the effective deuterium density is eventually expressed as $$\frac{n_{\textit{eff}}(x, t)}{n_0} = \tag{36}$$

$$\varepsilon + \frac{L}{l}(1-\varepsilon) - \frac{2L}{l\pi}(1-\varepsilon)\sum_{s}\frac{1}{s}\sin\left(s\pi\frac{l}{L}\right)\cos\left(s\pi\frac{x}{L}\right)\exp(-s^2\eta).$$

Figure 5:
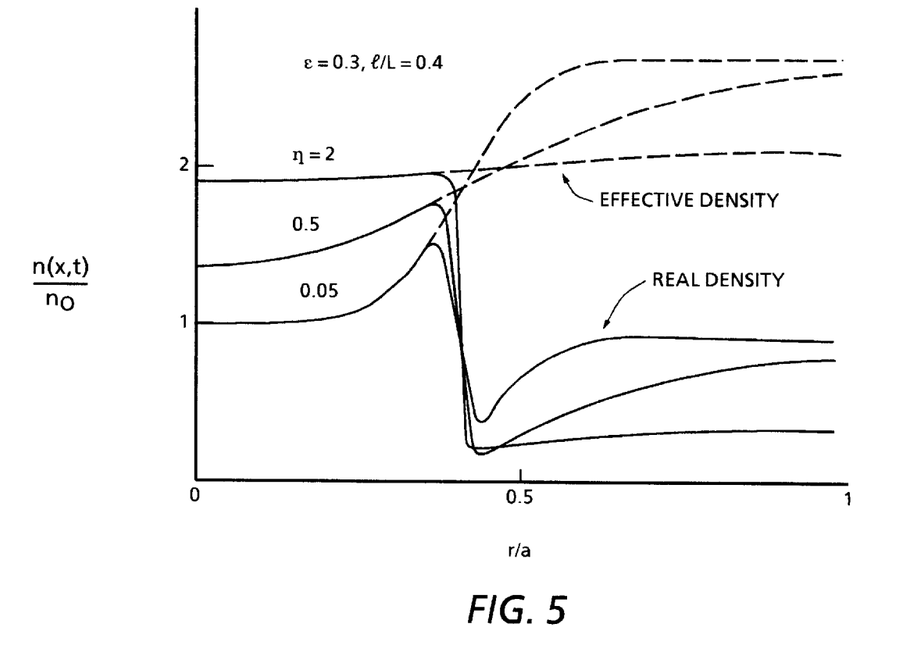
FIG. 5 are plots of normalized real (solid curve) and effective (dashed curves) densities, versus $x/L$ for normalized remnant density $\epsilon=0.3$, the parameter $l/L=0.4$ and several different values of normalized time $\eta$.

To estimate the deuterium density as a function of time, equation (35) is investigated numerically. The plots of the normalized real (solid curves) and effective (dashed curves) densities versus x/L shown in FIG. 5, are obtained from equations (31) and (36) for the normalized remnant density $\epsilon=0.3$, the parameter $l/L=0.4$ and several values of normalized time $\eta$. Substituting $\epsilon=0.3$ and $l/L=0.4$ into equation (27), the ratio $S_2/S_1=0.1463$ is determined, which is a reasonable hypothetical number. Thus, the real and effective densities are identical for the range $0<x<l$ [see equation (3)]. In the real density profile, the high density is in the range of $0<x<l$. However, in FIG. 5 the density profile n(n,t) is presented, which connects smoothly the high density portion with the low density portion. Several points are noteworthy from FIG. 5. First, the effective density has a step function profile in early time as predicted from Equation (29). The real density n has a uniform value $n_0$. Second, the initial diffusion of deuterium atoms in the hot region is driven by a stiff effective density gradient at $x=l$. The effects of temperature gradient is well represented by the effective density profile. Third, deuterium atoms in the hot region migrate to the old region as time progresses, depleting density in the hot region as predicted by Equation (26). Eventually, the deuterium density is identical to Equation (26). As shown in FIG. 4, more than 90% of the necessary migration of deuterium atoms is completed within the normalized time $\eta=2$, which corresponds to the migration time of $t=7.8$ days for $L=10$ cm and the diffusion coefficient of $D=3\times10^{-5}$ $cm_2$ $sec^{-1}$. The diffusion coefficient in such an example is 100 times that for the room temperature 27° C. This high diffusion coefficient is well justified when the heat sink temperature $T_1$ is close to 100° C.

Figure 7:
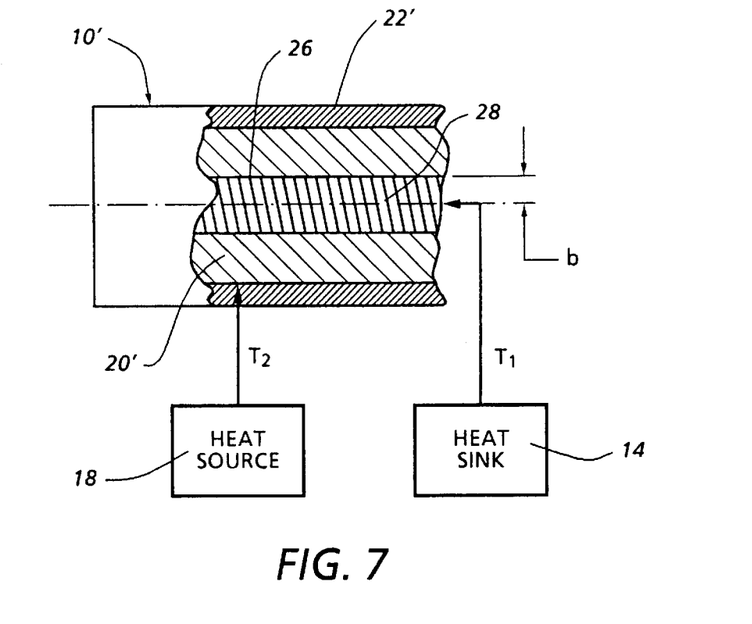
FIG. 7 is a partial schematic side section view of a palladium rod type arrangement in accordance with another embodiment of the invention.

In order to generate temperature gradient in the radial direction, a hole 26 with radius b is bored along the axis 24 of a palladium rod 10' according to another embodiment shown in FIG. 7. A heat sink material 28 is inserted into hole 26. The surface of the tubular body 20' of rod 10' is in contact with heat source 18 at temperature $T_2$, while the inner surface of the small hole 26 is in contact with heat sink material 28 at temperature $T_1$. Therefore, the temperature T(r) in the region of $b<r<a$ is given by $$T(r) = (T_2 - T_1)\frac{\ln(r/b)}{\ln(a/b)} + T_1. \tag{37}$$

It is again assumed that the local solubility S has a step function profile, changing abruptly at the critical temperature $T=T_c$ as discussed with respect to Equation (23). Therefore the local solubility S is expressed as $$S(r) = \begin{cases} S_1, & b < r < R, \\ S_2, & R < r < a, \end{cases} \tag{38}$$

where the radius R corresponding to the critical temperature $T_c$ is determined from Equation (37). For the sake of simplicity in the subsequent analysis, it is assumed that the radius b of inner hole is very small in comparison with the critical radius R, i.e., $$b<<R<a. \tag{39}$$

Neglecting the influence of the inner hold 26 on properties of the deuterium density, substituting Equation (38) into Equation (21) and making use of Equation (22), the steady-state density is determined by $$n(r) = \begin{cases} n_1 = \left[\varepsilon + (1-\varepsilon)\frac{a^2}{R^2}\right]n_0, & r < R, \\ n_2 = \varepsilon n_0, & R < r < a, \end{cases} \tag{40}$$

where the normalized remnant density $\epsilon$ is related to the solubility by $$\varepsilon = \frac{\frac{S_2}{S_1}}{\frac{R^2}{a^2} + \left(1 - \frac{R^2}{a^2}\right)\frac{S_2}{S_1}}. \tag{41}$$

Note from Equations (40) and (41) that the concentration density in the cold region is a function of the parameter $a^2/R^2$. A small increase in the radius ration a/R results in a drastic increase in the concentration density.

The effective deuterium density at $t=0$ is given by $$n_{\textit{eff}} = \begin{cases} n_0, & 0 < r < R, \\ n_1 + (1-\varepsilon)n_0, & R < r < a, \end{cases} \tag{42}$$

which starts to diffuse through the palladium rod according to the diffusion equation (10). The diffusion coefficient D is assumed to be uniform for a small temperature difference between the heat source and sink. Obviously, the effective density which satisfies Equation (10) is a combination of the steady-state and time-transient solutions. That is $$n_{\textit{eff}}(r, t) = n_1 + \sum_n a_n J_0\left(\alpha_n\frac{r}{a}\right)\exp(-\alpha_n^2\zeta), \tag{43}$$

where $\alpha_n$ is the nth root of $J_1(\alpha_n)=0$ and the normalized time $\zeta$ is defined in Equation (13). Note that the effective density in Equation (43) satisfies the boundary condition in Equation (23), thereby conserving the total number of deuterium atoms inside the palladium rod.

The effective density in Equation (43) is equal to that in Equation (42) for $\zeta=0$. Thus the coefficient $a_n$ is related to the difference of the steady-state values of the densities in Equations (42) and (43), and is expressed as $$\sum_n a_n J_0\left(\alpha_n\frac{r}{a}\right) = \begin{cases} n_0 - n_1, & 0 < r < R, \\ (1-\varepsilon)n_0, & R < r < a. \end{cases} \tag{44}$$

Multiplying both sides of Equation (44) by $rJ_0(\alpha_n r/a)$ and making use of the orthogonality of the Bessel function in Equation (15), the coefficient ($a_n$) is:

$$a_n = -2(n_1 - \varepsilon n_0)\frac{R}{a}\frac{J_1(\alpha_n R/a)}{\alpha_n J_1^2(\alpha_n)}. \tag{45}$$

Substituting expression (45) into Equation (43), the effective deuterium density is expressed as $$\frac{n_{\mathit{eff}}(r,t)}{n_0} =$$ (46)

$$\varepsilon + (1-\varepsilon)\frac{a^2}{R^2} - \frac{2a}{R}(1-\varepsilon)\sum_n \frac{J_1(\alpha_n R/a)}{\alpha_n J_1^2(\alpha_n)} J_0\left(\alpha_n \frac{r}{a}\right)\exp(-\alpha_n^2 \zeta).$$

The real deuterium density is related to the effective density by $$n(r,t) = n_{\mathit{eff}}(r,t) - (1-\varepsilon)\frac{a^2}{R^2} n_0 U[(a-r)(r-R)],$$ (47)

where U(x) is the Heaviside step function.

Figure 6:
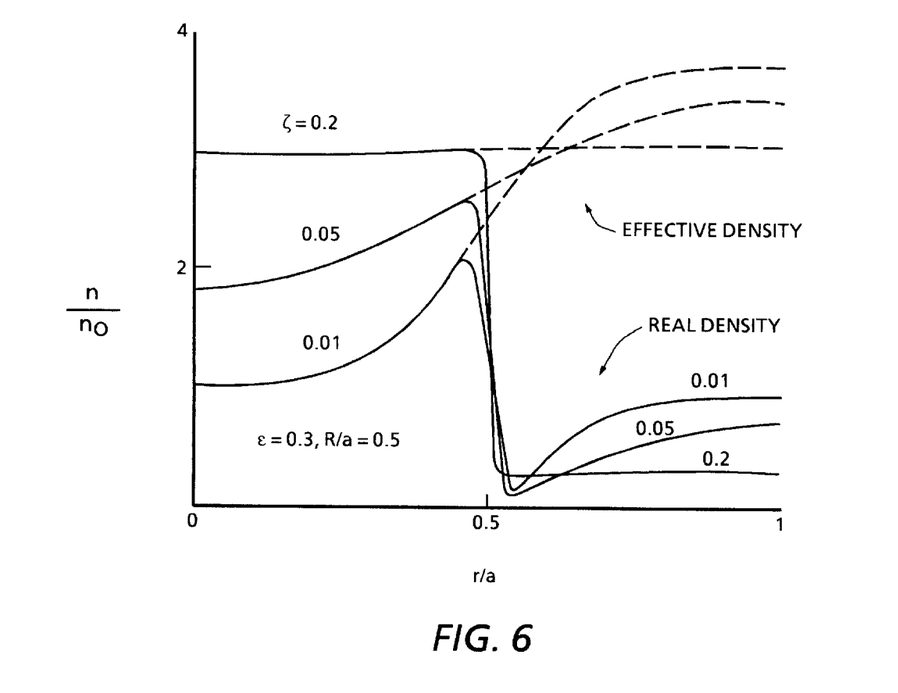
FIG. 6 are plots of normalized real (solid curves) and effective (dashed curves) densities, versus normalized radius $r/a$ for normalized remnant density $\epsilon=0.3$, the ratio $R/a=0.5$ and several different values of normalized time $\zeta$.

Numerical investigation of Equations (46) and (47) has been carried out for a broad range of physical parameters including the remnant density ($\epsilon$), the critical radius (R/a), time ($\zeta$) and the radius r. Shown in FIG. 6 are plots of the real density (solid curves) and the effective density (dashed curves) versus the normalized radius r/a obtained for the normalized remnant density $\epsilon$=0.3, the ratio R./a=0.5 and several different values of the normalized time $\zeta$. About 90% of the necessary migration of deuterium atoms is completed within the normalized time $\zeta$=0.1, which corresponds to the real time of t=one hour for the palladium rod radius a=1 cm and the diffusion coefficient D=3×10$^{-5}$ cm$^2$ sec$^{-1}$ (assuming that the palladium temperature is near 100° C.). Obviously, the migration time in the cylindrical geometry of FIG. 7 is much shorter than that in the linear system of FIG. 1, simply because of the fact a <<L in general. Diffusion characters of deuterium atoms in the cylindrical geometry are very similar to those in the linear system (see FIG. 5). One notable difference between the cylindrical and linear systems is the density concentration intensity. In the cylindrical geometry, the deuterium atoms converge inward and create a tremendous density concentration. In this regard, the cylindrical geometry is more efficient in creating a highly dense region.

Figure 8:
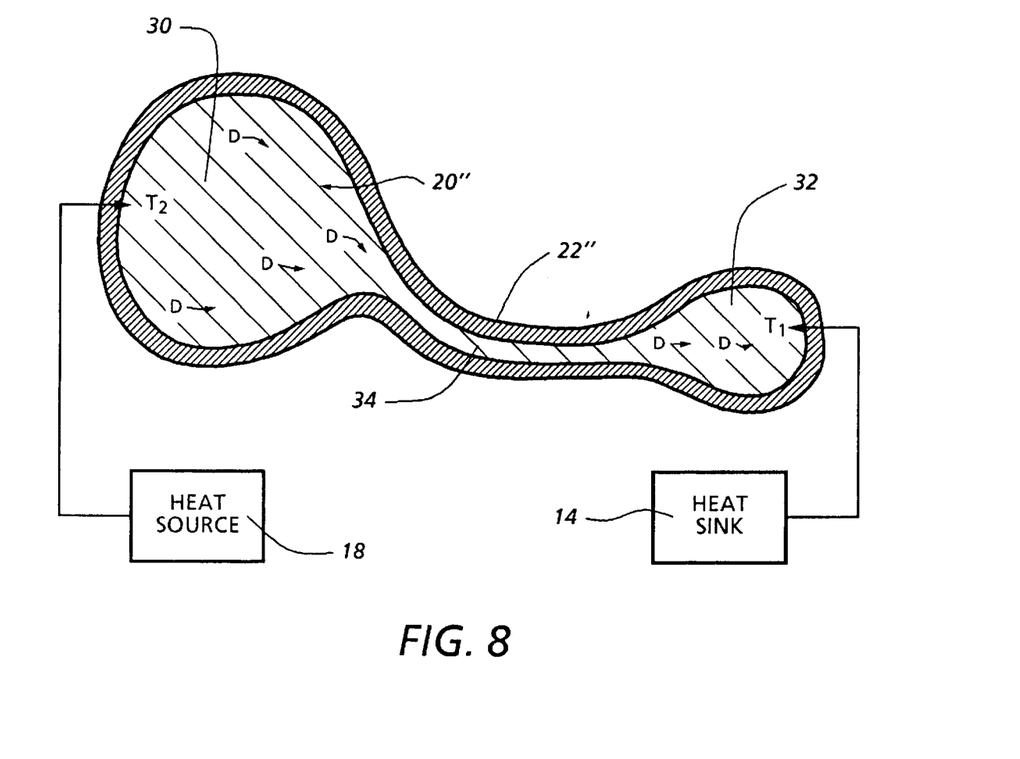
FIG. 8 is a partial schematic side section view of a palladium sample arrangement in accordance with yet another embodiment of the invention.

In accordance with yet another embodiment of the invention as shown in FIG. 8, the palladium sample is in the form of a body 20" having a relatively large volumetric end portion 30 and an opposite small volumetric end portion 32. The end portion 30 is connected to heat source 18 so as to establish therein the hot region at temperature $T_2$ while the end portion 32 is connected to heat sink 14 to establish therein the cold region at temperature $T_1$. The palladium body 20" furthermore includes a relatively narrow portion 34 intermediate the end portions 30 and 32 to form a capillary passage for reduced flow of thermal energy to enhance the migration of deuterium atoms from the hot region at temperature $T_2$ to the cold region at temperature $T_1$ as hereinbefore described. Further, the palladium body 20" is fully enclosed by a casing 22" of a metallic diffusion barrier material.

In conclusion, the solubility of deuterium atoms in palladium is a complicated function of temperature, which should be a continuous function of location. Also, the diffusion coefficient D in the hot region is considerably larger than that in the cold region. Thus, the deuterium density during the migration time could be also piling up near x=l in the linear system or near r=R in the cylindrical geometry, due to non-uniform diffusion coefficient. In this context, the periodic temperature changes at the heat sink and heat source may enhance the fusion probability in the palladium rod. This local density pile-up can be greatly enhanced by a large difference of diffusion coefficients in the hot and cold regions. Based on the foregoing, a high-density deuterium is achieved by compression into a local volume of a palladium body making use of the temperature gradient effects on the solubility of deuterium therein. The heat source 18 at temperature $T_2$ and heat sink 14 at temperature $T_1$ are in contact with two different parts of the palladium sample, which is presoaked with deuterium atoms and enclosed by diffusion-barrier material to create the temperature gradient in the sample. Since the deuterium solubility decreases as temperature rises, deuterium atoms in the hot region are forced to migrate into the cold region, thereby establishing a concentration gradient in deuterium density. From investigations outlined herein of loss rate of deuterium from the palladium body enclosed by the diffusion barrier, it has been determined that the loss rate is inversely proportional to the barrier thickness, and proportional to the diffusion coefficient and the solubility of deuterium atoms in the barrier material. Discharge of the absorbed deuterium from the coated palladium body surface can be effectively reduced to one year (T=1 year) by way of example, where an iron-nickel alloy type of diffusion barrier is utilized with a thickness of $\Delta$x=1 $\mu$m. Migration behavior of deuterium atoms in palladium has been graphically presented in FIGS. 5 and 6 based on the fact that the solubility of deuterium is a decreasing function of temperature and that the total number of deuterium atoms in the palladium body is conserved. Once the temperature gradient is established, the deuterium atoms start to migrate from the hot region to the cold region and the density profile will eventually settle into the steady-state value in terms of the ration $S_2/S_1$ of the solubility in the hot region to that of the cold region. The deuterium density concentrated in the cold region under steady-state condition is a few times its initial value for a reasonably small value of the ration $S_2/S_1$.

Numerous other modifications and variations of the present invention are possible in light of the foregoing teachings. It is therefore to be understood that within the scope of the appended claims the invention may be practiced otherwise than as specifically described.

What is claimed is:

1. A method of concentrating isotopic hydrogen within a predetermined region of a solid-state body having the isotopic hydrogen absorbed therein, including the steps of: enclosing the solid-state body within a diffusion barrier to reduce leakage of the isotopic hydrogen absorbed; heating the solid-state body at a location therein spaced from the predetermined region after said enclosing in the diffusion barrier to establish a temperature gradient inducing flow of thermal energy toward said predetermined region; continuing said heating of the solid-state body at said location therein until density of the isotopic hydrogen absorbed within the predetermined region increases to a steady-state level; and restricting said flow of the thermal energy by confinement of said flow to a capillary passage formed by shaping of the solid-state body between said heating location and the predetermined region, to enhance migration of the isotopic hydrogen absorbed from said heating location toward the predetermined region thereby effecting said increases in the density thereat of the isotopic hydrogen absorbed to the steady-state level.

2. The method as defined in claim 1 wherein the increases in density of the isotopic hydrogen absorbed depends on factors which include selection of material from which the solid-state body is formed and concentration of the isotopic hydrogen absorbed therein.

3. The method as defined in claim 2 wherein the selected material is palladium.

\* \* \* \* \*